United States Patent
Åsen et al.

(10) Patent No.: US 7,163,648 B2
(45) Date of Patent: Jan. 16, 2007

(54) METHOD FOR MANUFACTURING A HYDROGEN AND NITROGEN CONTAINING GAS MIXTURE

(75) Inventors: Knut Ingvar Åsen, Porsgrunn (NO); Henrik Solgaard Andersen, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 540 days.

(21) Appl. No.: 10/467,921

(22) PCT Filed: Feb. 11, 2002

(86) PCT No.: PCT/NO02/00058

§ 371 (c)(1),
(2), (4) Date: Oct. 6, 2003

(87) PCT Pub. No.: WO02/072470

PCT Pub. Date: Sep. 19, 2002

(65) Prior Publication Data
US 2004/0170557 A1 Sep. 2, 2004

(30) Foreign Application Priority Data
Feb. 16, 2001 (NO) .................... 20010784

(51) Int. Cl.
*C01B 3/32* (2006.01)
*C01B 3/34* (2006.01)

(52) U.S. Cl. .................................................. 252/376
(58) Field of Classification Search ............ 252/376; 423/650, 651, 652

See application file for complete search history.

(56) References Cited

U.S. PATENT DOCUMENTS 3,901,668 A * 8/1975 Seitzer ..................... 423/579
4,172,885 A 10/1979 Perry (Continued)

FOREIGN PATENT DOCUMENTS

EP 0212889 3/1987

(Continued)

*Primary Examiner*—Wayne A. Langel
(74) *Attorney, Agent, or Firm*—Wenderoth, Lind & Ponack, L.L.P.

(57) ABSTRACT

The present invention relates to a method for manufacturing a hydrogen- and nitrogen containing gas mixture, where a mixture of steam and a carbon containing gas is fed to the retentate side of at least one hydrogen transport membrane syngas and sweep gas generator where said gas and steam are converted to synthesis gas. A part of the hydrogen in said synthesis gas is transported through the membrane to the permeate side in said generator where it reacts with oxygen in an air stream fed to said permeate side to generate heat and a nitrogen and steam containing gas. The synthesis gas is further fed to the retentate side of a downstream hydrogen transport membrane unit or a hydrogen transport membrane reactor where a major part of the hydrogen in said synthesis gas, and if a reactor is used, a major part of additional hydrogen generated at the retentate side in said reactor is transported through said downstream membrane and picked up by said nitrogen containing gas to form a hydrogen- and nitrogen containing gas mixture. Furthermore, the invention relates to a method for performing a catalytic or non-catalytic process wherein the hydrogen- and nitrogen containing gas mixture manufactured by the method according to claims 1–6 is applied as one of the reactants in said process.

5 Claims, 3 Drawing Sheets

U.S. PATENT DOCUMENTS

| | | |
|---|---|---|
| 4,180,552 A | 12/1979 | Graham et al. |
| 4,981,676 A * | 1/1991 | Minet et al. ............... 423/652 |
| 5,211,728 A * | 5/1993 | Trimmer ........................ 95/47 |
| 5,217,506 A * | 6/1993 | Edlund et al. ................. 95/56 |
| 5,229,102 A | 7/1993 | Minet et al. |
| 6,066,307 A | 5/2000 | Keskar et al. |
| 6,919,062 B1 * | 7/2005 | Vasileiadis et al. ...... 423/437.1 |

FOREIGN PATENT DOCUMENTS

| | | |
|---|---|---|
| EP | 1061039 | 12/2000 |
| JP | 5-147902 | 6/1993 |
| RU | 798031 | 1/1981 |
| WO | 0046150 | 10/2000 |

* cited by examiner

METHOD FOR MANUFACTURING A HYDROGEN AND NITROGEN CONTAINING GAS MIXTURE

The present invention relates to a method for providing a hydrogen and nitrogen containing gas mixture, and a method for performing a catalytic or non-catalytic process wherein the hydrogen and nitrogen containing gas mixture is one of the reactants.

In conventional catalytic or non-catalytic processes where hydrogen is one of the reactants, hydrogen is usually provided by generating synthesis gas by means of steam reforming of natural gas at 700–850° C. and 15–30 bar. Since the main component in natural gas is methane, the following main reaction takes place:

$$CH_4 + H_2O = CO + 3H_2 \quad (1)$$

Steam is added such that the ratio between steam and carbon normally is between 2 and 4.

The synthesis gas mixture is cooled to below 400° C., and CO is shifted to $CO_2$ and $H_2$ by reaction with water in one or two stages with intercooling:

$$CO + H_2O = CO_2 + H_2 \quad (2)$$

Heat is normally recovered by generation of steam.

Synthesis gas containing hydrogen can also be produced by partial oxidation of e.g. methane by the following reaction:

$$CH_4 + 0.5O_2 = CO + 2H_2 \quad (3)$$

CO is further shifted to $CO_2$ and $H_2$. In order to avoid carbon formation in the reactor and the pre-heaters steam is added. Pure oxygen, oxygen enriched air or air may be used as oxidant.

Synthesis gas containing hydrogen may also be generated by means of a mixed oxygen ion and electron conducting membrane which is installed in a reactor, e.g. as described in U.S. Pat. No. 5,356,728.

Different methods are then used to separate hydrogen from the synthesis gas. The four most common methods are either to remove $CO_2$ from the synthesis gas mixture by means of absorption of $CO_2$, e.g. by means of alkanole amines, or recover hydrogen by means of pressure swing adsorption, by means of cryogenic techniques or by means of a membrane separation process.

All methods imply that either one of the product gases have to be recovered at low pressure which will reduce the usefulness of one of the product gas streams, or the pressure may be maintained by supply or use of thermal or mechanical energy which necessitate application of expensive process equipment.

In the field of gas separation, several methods are known. A rather advanced technique involves application of hydrogen selective inorganic membranes. Hydrogen is transported from the retentate side to the permeate side of the membrane. The driving force for mass transport can be pressure gradients or in some cases electrical fields. Such a membrane is defined as a hydrogen transport membrane. Several types of hydrogen transport membranes are mentioned in the literature, e.g. porous inorganic membranes, zeolite membranes, palladium (Pd)-based membranes and proton conducting membranes (as e.g. described in a paper presented by Rune Bredesen, SINTEF, at a seminar in Calibria, Italy 1–4 May 1996: "Seminar on the Ecological Applications of Innovative Membrane Technology in the Chemical Industry").

Porous membranes have normally an asymmetric structure consisting of a thin membrane top layer (which is the separative layer) with small pores (10 mm to less than 1 nm) and a narrow pore size distribution supported on a porous support with the necessary mechanical strength. Typical membrane materials are $Al_2O_3$, $TiO_2$ and $SiO_2$.

Zeolite membranes may be prepared by forming zeolite crystals on the surface or in the pore structure of a support, e.g. silicalite-1 deposited on g-$Al_2O_3$.

Porous and zeolite membranes are not 100% selective to hydrogen and other compounds will permeate through the membrane giving a product with less than 100% hydrogen.

Pd-based membranes are 100% selective to hydrogen diffusion. The transport of hydrogen is by H-atoms in the lattice which are formed on the surface by dissociative adsorption and subsequent dissolution in the metal. Pd-membranes are alloyed with other metals as Ag, Rh, Ru, rare earths, in order to avoid volume expansion. Commercial Pd-alloy membranes, mainly alloyed with Ag, are available.

Proton conducting membranes are also 100% selective to hydrogen. Proton conduction has been observed in several peroskite materials, e.g. materials based on $SrCeO_3$, $BaCeO_3$, $CaZrO_3$ and $SrZrO_3$. The driving force for mass transport can be pressure gradients or an electrical field. A hydrogen partial pressure difference causes hydrogen to be transported through the membrane from the retentate side to the permeate side.

Application of hydrogen transport membranes in a combined hydrogen separation and synthesis gas production reactor is e.g. known from U.S. Pat. No. 5,229,102. In this reactor synthesis gas is generated by means of the above mentioned reaction (1) and hydrogen is continuously removed from the reaction zone by permeation through the hydrogen transport membrane. Hydrogen is then recovered on the permeate side at low pressure. Alternatively steam at elevated pressure may be used as sweep gas to recover hydrogen as a hydrogen/steam mixture at elevated pressure.

If hydrogen is recovered at low pressure, this is a disadvantage if hydrogen is required at high pressure. Thus the recovered hydrogen needs to be cooled to near ambient temperature and recompressed with an intercooled compressor. Finally the hydrogen may be reheated before entering a reactor where a catalytic or non-catalytic process takes place. Application of a sweep gas could let the permeated gas (i.e. the hydrogen gas) be recovered as a hydrogen/sweep gas mixture at elevated pressure as described above. However, the energy consumption and the cost of generating the sweep gas will in that case be essential.

The main object of the present invention was to arrive at a method for manufacturing a hydrogen- and nitrogen containing gas mixture which is utilized as a reactant in a catalytic or non-catalytic process.

Another object of the present invention was to manufacture a hydrogen- and nitrogen containing gas mixture in a way that implies reduced energy consumption and investment costs.

Furthermore, another object of the present invention was to arrive at a method for performing a catalytic or non-catalytic process in a way that implies reduced energy consumption and investment costs.

One problem the inventors faced in their search for an economical hydrogen supply, was that conventional synthesis gas process configurations could not be adopted. Any steam production section, CO-shift reactors and traditional low temperature hydrogen separation processes in the hydrogen process should be omitted since these process stages are very expensive and inefficient. Furthermore, it would be advantageous to be able to utilise only existing process streams in any stage of the synthesis gas process since supply of any auxiliary gas streams usually demands investments in auxiliary process equipment. It would also be advantageous to make use of existing unconverted or unused gas generated in the synthesis gas process. Thus, the inventors started to look for solutions that might meet all these requirements.

By application of hydrogen transport membranes, hydrogen can be separated and recovered from synthesis gas at elevated temperature or at a temperature equal the temperature in the synthesis gas reactor. This will eliminate the steam generation section, CO-shift section and the low temperature hydrogen separation section. In order to obtain a high separation efficiency and to avoid cooling and recompression of the hydrogen stream an applicable sweep gas for the permeate side of the membrane should be available.

However, one requirement was that the application of a sweep gas in said process should not require supply of additional gases and it should be possible to make the sweep gas without installation of expensive new process equipment.

In the ammonia synthesis process, or if hydrogen is to be used as fuel in a power or heat generation process, the hydrogen product may contain a certain amount of nitrogen. In the ammonia synthesis process a mixture of about 25% nitrogen and 75% hydrogen is used as feed gas. If hydrogen is to be used as fuel e.g. in a gas turbine combuster, it is advantageous to use a diluted fuel in order to moderate or reduce the flame temperature. A reduced flame temperature will reduce the $NO_x$ formation. Nitrogen is in that sense a perfect diluent since air (which normally is the oxidant in any combustion process) already contains a lot of nitrogen. Thus, the inventors started to look for a method that could generate nitrogen which could be utilized as sweep gas and at the same time could meet all the requirements mentioned above.

After having evaluated various ways of generating a nitrogen containing sweep gas stream, the inventors decided to further investigate the possibility of applying hydrogen transporting membranes.

In all processes that generate synthesis gas, air is used either directly or indirectly as a source for oxygen. If synthesis gas is generated by means of the endothermic reaction (1) as mentioned above, i.e. by means of steam reforming, heat needs to be added. In conventional steam reformers heat is generated by burning a fuel in air outside the reformer tubes. The heat content in the flue gas stream is recovered by partly preheating the feed gases in the process or partly by generating steam.

In the combined synthesis gas and hydrogen membrane process described in U.S. Pat. No. 5,229,102, synthesis gas is generated on the retentate side of a hydrogen transport membrane reactor defined as a container consisting of a hydrogen transport membrane where hydrogen is generated on the retentate side by means of the above mentioned steam reforming reaction (1) and shift reaction (2), and where the retentate side contains a steam reformer and/or a CO shift catalyst, and where generated hydrogen is transported through the membrane to the permeate side.

A mixture of steam and natural gas is passed (in this case) over a steam reformer catalyst consisting of nickel metal promoted with alkali metal salts. The hydrogen in the synthesis gas stream is transported through the membrane (consisting of layers of gamma and alpha alumina) and recovered by sweeping the membrane surface with steam. Thus, the product will be a mixture of steam and hydrogen. Heat utilized in the process is generated in a third zone by reacting air with a fuel.

If synthesis gas is generated by means of partial oxidation, the oxidant is mixed with the methane containing feed gas. Any inert components in the oxidant stream will then be mixed with the synthesis gas. If only a low content of inert compounds in the synthesis gas is desirable, an air separation unit is needed to generate pure oxygen (i.e. to eliminate the inert components in air), e.g. by means of a cryogenic unit or by means of pressure swing absorption. Oxygen may also be separated from air at high temperature by means of mixed oxygen and electron conducting membranes. In this case compressed and heated air is fed to the retentate side of the mixed conducting membrane and oxygen may be recovered at near ambient pressure on the permeate side of the membrane.

Independent of selected synthesis gas process, hydrogen may be recovered by passing the hydrogen containing synthesis gas over a hydrogen transport membrane. In order to recover hydrogen at elevated pressure a sweep gas will be needed.

In a cryogenic air separation process nitrogen is normally extracted at near ambient pressure and temperature. Thus, if produced nitrogen should be used as sweep gas, it needs to be compressed and in most cases also re-heated. The sweep gas should not contain any significant amount of oxygen since oxygen will react with hydrogen permeated through the membrane. A cryogenic plant represents also substantial capital costs and energy consumption. Thus, the application of this plant is not associable with the aim of producing hydrogen at a low cost and without extensive energy consumption. However, said problems are avoided if the sweep gas is generated at high pressure and temperature and by means of already existing process streams. The challenge for the inventors was to generate a nitrogen containing sweep gas containing only small amounts of oxygen, preferably below 1 vol % oxygen.

It was then found that by utilizing a hydrogen transport membrane reactor it was possible at the same time to both generate synthesis gas and a nitrogen and steam containing sweep gas stream containing a very low concentration of oxygen if air was fed to the permeate side of the membrane. The combined hydrogen transport membrane reactor for generation of both synthesis gas and sweep gas is hereafter defined as a Hydrogen Transport Membrane Syngas and Sweep gas Generator.

Synthesis gas is generated at the retentate side of said generator (or optionally two or three generators in series) by feeding a mixture of a carbon containing gas, e.g. natural gas, and steam to this side. The retentate side contains a steam reformer catalyst and synthesis gas is generated by means of the endothermic reaction (1) as mentioned above. 1 mol CO and 3 mol $H_2$ is generated for each mol methane added to the reactor.

25 to 40% of the generated hydrogen is permeated through the membrane to the permeate side and reacts with air entering this side. The combustion of hydrogen generates heat that is partly used to heat the incoming air and partly transferred to the synthesis gas generating side (the retentate side) in the generator. Synthesis gas is generated according to the endothermic reaction (1) as mentioned above. The heat generation and the temperature in the synthesis gas reactor is controlled by regulating the ratio between air and the carbon containing feed gas. Hydrogen reacts easily with oxygen in said air stream at the surface of the membrane and by means of this method the content of oxygen in the air stream may be reduced to below 1 vol %. The oxygen depleted air stream will then consist of about 64.5% nitrogen, 34.5% $H_2O$ and minor amounts of argon and oxygen and is applicable as a sweep gas. The method may be carried out in e.g. two steps at different temperatures. The reactor in step one may consist of a medium temperature hydrogen transport membrane, e.g. Pd/Ag type operating at 400 to 600° C. Step two may consist of a high temperature hydrogen transport membrane, e.g. a proton conducting membrane operating at a temperature above 600° C.

The heat requirement in reaction (1) is 206 kJ/mol, while combustion of one mol hydrogen generates 242 kJ/mol. The surplus heat is thus used for heating the feed gases. In principle the hydrogen transport membrane syngas and sweep gas generator generates a synthesis gas equal the synthesis gas generated by partial oxidation of natural gas with pure oxygen.

The nitrogen and steam containing gas, i.e. the sweep gas, generated in the Hydrogen Transport Membrane Syngas and Sweep gas Generator, enters the permeate side of a downstream Hydrogen Transport Membrane unit or alternatively a Hydrogen Transport Membrane Reactor.

The Hydrogen Transport Membrane unit is a device containing a retentate side and a permeate side separated by a hydrogen permeable membrane.

The hydrogen transport membrane reactor is a device containing a retentate side and a permeate side separated by a hydrogen permeable membrane where the retentate side is equipped with a catalyst capable of converting CO with $H_2O$ to $CO_2$ and $H_2$ and also capable of converting $CH_4$ with $H_2O$ to CO and $H_2$.

Synthesis gas generated in the upstream Hydrogen Transport Membrane Syngas and Sweep gas Generator enters the retentate side of the Hydrogen Transport Membrane unit or the retentate side of the Hydrogen Transport Membrane Reactor.

If the downstream unit is a Hydrogen Transport Membrane unit, a major part of the hydrogen in the synthesis gas entering the retentate side of the membrane is transported to the permeate side of the membrane and is further picked up by the nitrogen and steam containing sweep gas generated in the upstream generator.

If the downstream unit is a Hydrogen Transport Membrane Reactor, a major part of the hydrogen in the synthesis gas that enters the retentate side of the membrane reactor, and a major part of additional hydrogen generated at the retentate side of the membrane reactor, are transported to the permeate side of the membrane reactor and is further picked up by the nitrogen and steam containing sweep gas generated in the upstream generator.

Additional hydrogen is as mentioned above generated at the retentate side of the Hydrogen Transport Membrane Reactor. Hydrogen is partly generated by means of the steam reforming reaction (1) and partly by CO-shift reaction (2). The amount of hydrogen generated in this reactor depends on the composition of the synthesis gas fed to the reactor. Methane ($CH_4$) will be converted to CO and $H_2$ by means of reaction (1) while CO will be shifted to $H_2$ and $CO_2$ by means of reaction (2). Since hydrogen is removed continuously, reactions (1) and (2) will proceed to the right and more $CH_4$ and CO will be converted to hydrogen and $CO_2$.

By utilizing one, two or eventually three Hydrogen Transport Membrane Syngas and Sweep gas Generator(s) in series, and either a downstream Hydrogen Transport Membrane or a downstream Hydrogen Transport Membrane Reactor, the objects of the present invention were obtained.

Furthermore, in said method the sweep gas is generated from air. Air can be extracted from the compressor part of a gas turbine and is further fed to the permeate side of the Hydrogen Transport Membrane Syngas and Sweep gas Generator.

The generated mixture of sweep gas and hydrogen is then utilized as a reactant in a catalytic or non-catalytic process, e.g. as fuel in a gas turbine combuster or as a reactant in the production of syngas for ammonia production.

Hydrogen depleted synthesis gas leaving the hydrogen transport membrane unit or the hydrogen transport membrane reactor contains unconverted CO and minor amounts of $H_2$ and $CH_4$. It may be reacted with oxygen delivered from a mixed conducting membrane or from any process separating oxygen from air. Hydrogen depleted synthesis gas may also be fed to the permeate side of a mixed conducting membrane reactor where combustible compounds are oxidised to $CO_2$ and water directly on the membrane surface. A mixed conducting membrane is defined as a membrane that conducts both oxygen ions and electrons and where pure oxygen can be recovered on the permeate side of the membrane. A mixed conducting membrane reactor is defined as a membrane reactor that conducts both oxygen ions and electrons and where oxygen permeated through the membrane reacts directly with combustible components fed to the permeate side of the membrane reactor. Generated heat may be utilised in energy production and generated $CO_2$ may be extracted from water by means of cooling and condensation of the water. $CO_2$ may further be deposited in an underground reservoir for long term deposition or may be utilised as pressure support for oil recovery. The invention will thus allow production of a low cost hydrogen/nitrogen mixture and at the same time allow recovery of all $CO_2$ generated in the process.

The scope of the invention and its special features are as defined by the attached claims.

The invention will be further explained and envisaged in the examples and corresponding figures.

Figure 1:
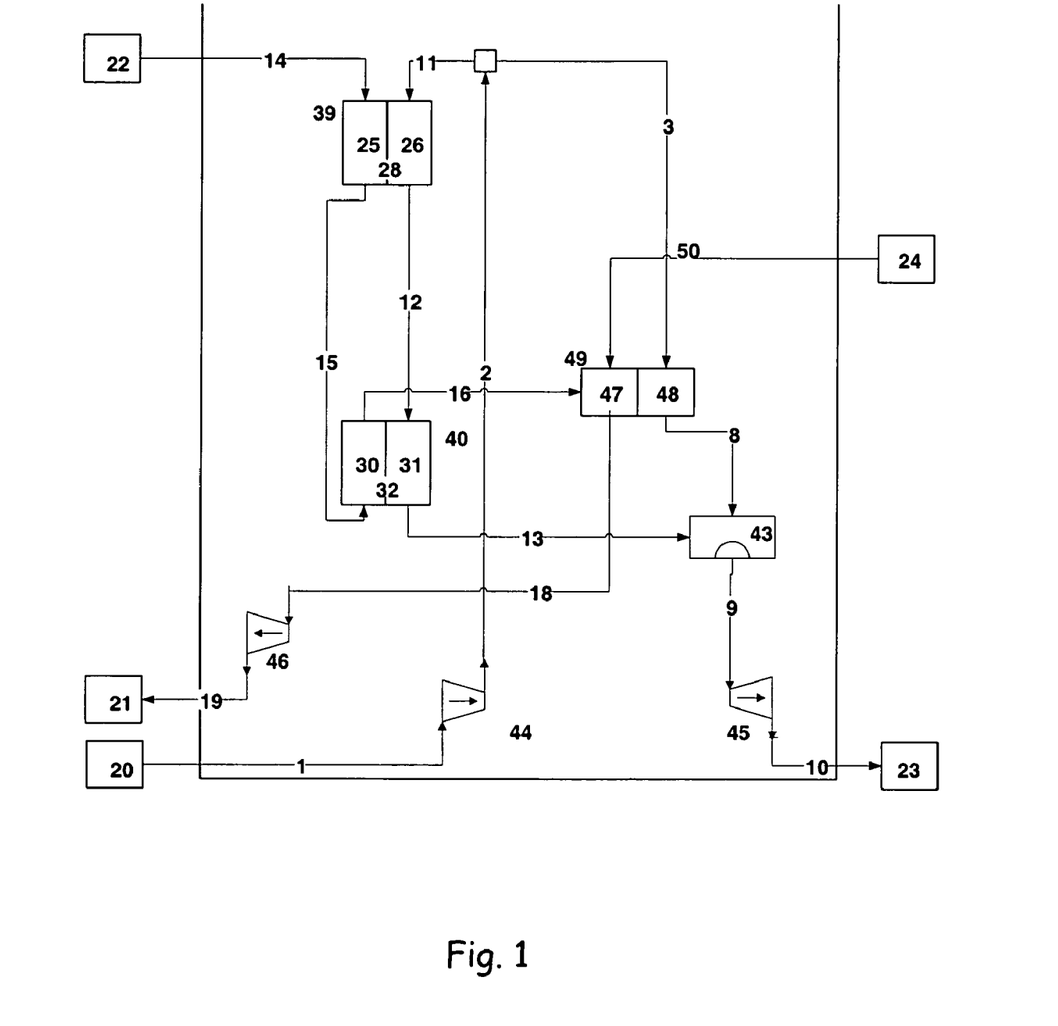
FIG. 1 shows a power generation process where a hydrogen containing fuel, provided according to the present invention at elevated pressure and temperature, is combusted.

FIG. 1 shows according to the present invention a power generation process where a mixture of hydrogen and nitrogen is generated in unit 39 and unit 40 and used as fuel in a gas turbine combuster 43.

A preheated, desulphurized and optionally prereformed mixture of natural gas and steam, stream 14, generated in unit 22, enters the retentate side 25 of a hydrogen transport membrane syngas and sweep gas generator 39 where natural gas and steam are converted to synthesis gas containing hydrogen, $CO_2$ and CO. Some hydrogen is transported through membrane 28 to the permeate side 26. Air, stream 1, from air filter 20, enters a gas turbine type compressor 44. The compressed hot air, stream 2, is divided into two streams, 3 and 11. Stream 3 enters 48 in unit 49 and is heated and fed to the gas turbine combuster 43. Stream 11 enters the permeate side 26 of unit 39 and oxygen in the air stream reacts with hydrogen transported through membrane 28 from the retentate side 25, to generate a hot nitrogen and steam containing sweep gas stream 12. Generated surplus heat is transferred to the retentate side 25. Hydrogen containing synthesis gas 15 enters the retentate side 30 of a downstream hydrogen transport membrane unit 40 and hydrogen is transported through membrane 32 and is picked up by sweep gas stream 12 counterclockwise or alternatively clockwise to stream 15. The hydrogen containing sweep gas stream 13 enters gas turbine combuster 43 and hydrogen is combusted in the air stream 8. The hot combusted gas stream 9 is depressurised in gas turbine generator 45 in order to generate mechanical or electrical power (not shown). Hot depressurised exhaust gas 10 enters a heat recovery system 23 in order to recover heat.

Hydrogen depleted synthesis gas stream 16 enters a combuster 47 and is combusted in an oxidant stream 50 that is generated in unit 24. Unit 24 may be a cryogenic air separation unit or an oxygen separating membrane unit or any air separation process capable of separating oxygen from air. The oxidant stream 50 may be a mixture of pure oxygen and steam, oxygen or $CO_2$ or a mixture of oxygen, $CO_2$ and steam. The air separation unit 24 may also be physically and thermally integrated with the power generating process. Heat generated in 47 is partly used to preheat air, and heat may also be recovered as electrical or mechanical power by depressurising the hot gas stream 18 in expander 46. Heat may also be recovered in 21 by generation of steam.

An alternative is that unit 40 is a hydrogen transport membrane reactor where the retentate side 30 contains a steam reforming catalyst or a CO shift catalyst to convert CO and $H_2O$ to $H_2$ and $CO_2$. Since the reaction $CO+H_2O=CO_2+H_2$ is slightly exothermic conversion of minor amounts of methane by the very endothermic steam reforming reaction $CH_4+H_2O=CO+3H_2$ may proceed without significant temperature drop in the reactor.

Figure 2:
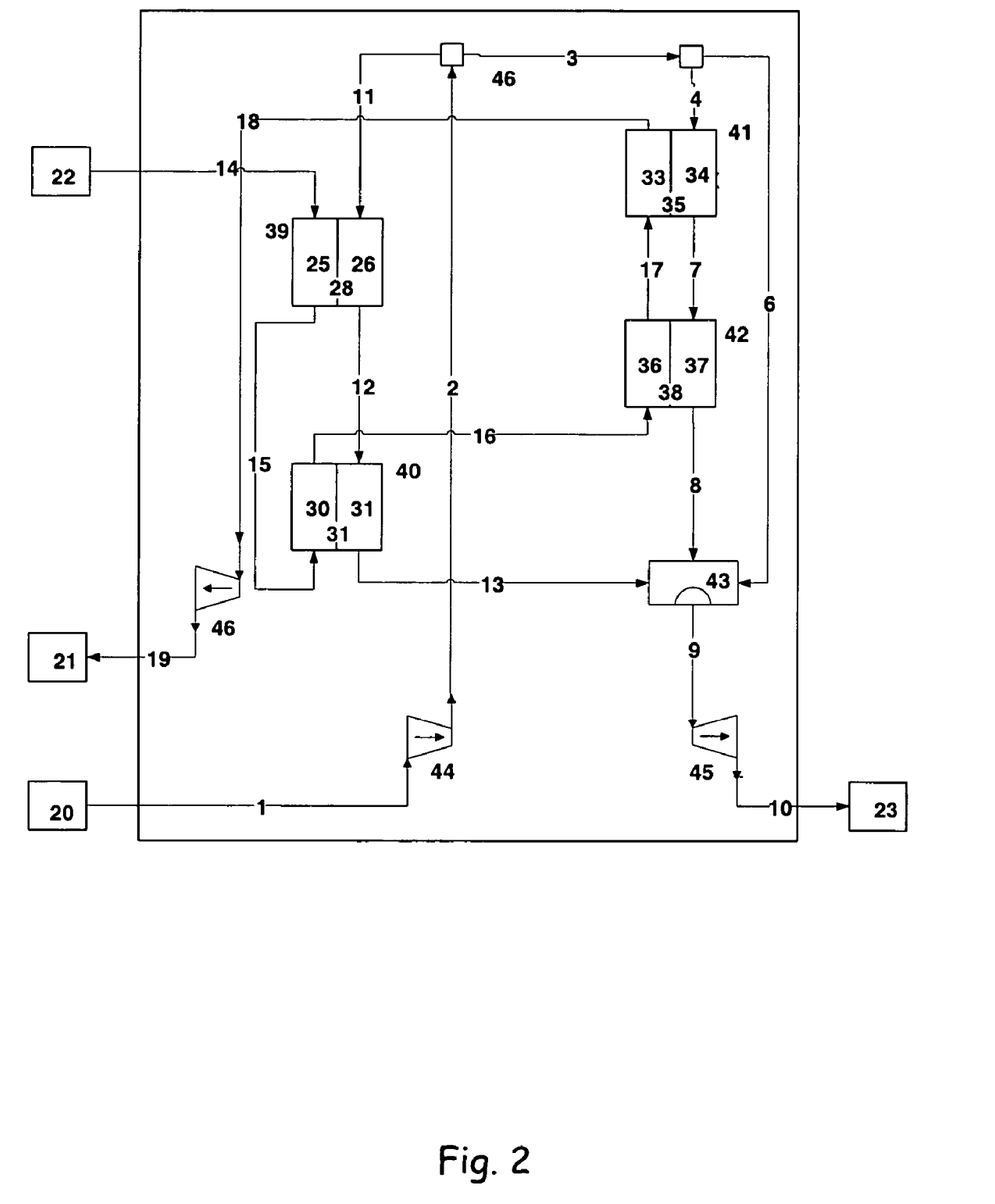
FIG. 2 shows an alternative process to that shown in FIG. 1 where a mixed conducting membrane reactor is applied in addition to a hydrogen transport membrane.

FIG. 2 shows a power and heat generation process similar to the process described in FIG. 1, but the hydrogen depleted synthesis gas is combusted in a mixed conducting membrane reactor. Generated heat is used to preheat compressed air to the gas turbine combuster 43.

A preheated, desulphurized and optionally pre-reformed mixture of natural gas and steam, stream 14, generated in unit 22, enters the retentate side 25 of a hydrogen transport membrane syngas and sweep gas generator 39 where natural gas and steam are converted to synthesis gas containing hydrogen, $CO_2$ and CO. Some hydrogen is transported through membrane 28 to the permeate side 26. Air, stream 1, from air filter 20, enters a gas turbine type compressor 44. The compressed hot air, stream 2, is divided into two streams, 3 and 11. Stream 3 is further divided into streams 4 and 6. Stream 4 enters heat receiving part 34 of heat exchanger 41 and is further fed to the retentate side 37 of a mixed conducting membrane reactor 42. The air stream 7 is further heated in unit 42 and simultaneously oxygen is transported through membrane 38 to the oxidation (permeate) side 36.

Hot oxygen depleted air 8 and air stream 6 enter gas turbine combuster 43. Part of air stream 6 may also be used as cooling medium for the gas turbine blades (not shown).

Stream 11 enters the permeate side 26 of unit 39 and oxygen in the air stream reacts with hydrogen transported through membrane 28 from the retentate side 25, to generate a hot nitrogen and steam containing sweep gas. Generated surplus heat is transferred to the retentate side 25. Hydrogen containing synthesis gas 15 enters the retentate side 30 of a downstream hydrogen transport membrane unit 40 and hydrogen is transported through the membrane and is picked up by sweep gas stream 12 counterclockwise or alternatively clockwise to stream 15. The hydrogen containing sweep gas stream 13 enters gas turbine combuster 43 and hydrogen is combusted in the oxygen depleted air streams 8 and 6. The hot combusted gas stream 9 is depressurised in gas turbine generator 45 in order to generate mechanical or electrical power (not shown). Hot depressurised exhaust gas 10 enters a heat recovery system 23 in order to recover heat as e.g. steam.

Hydrogen depleted synthesis gas stream 16 enters the oxidation side (permeate side) 36 of the mixed conducting membrane reactor 42 and combustible compounds are oxidized to $CO_2$ and water. Part of the generated heat is transferred to the retentate side 37. The hot combusted gas mixture 17 enters the hot side 33 of heat exchanger 41 where air stream 4 is preheated. Stream 18 enters turbine 46 and is depressurised to generate electrical or mechanical power. Heat in stream 19 may be recovered in 21 by generation of steam.

An alternative is that unit 40 is a hydrogen transport membrane reactor where the retentate side 30 contains a steam reforming catalyst or a CO shift catalyst to convert CO and $H_2O$ to $H_2$ and $CO_2$. Since the reaction $CO+H_2O=CO_2+H_2$ is slightly exothermic conversion of minor amounts of methane by the very endothermic steam reforming reaction $CH_4+H_2O=CO+3H_2$ may proceed without significant temperature drop in the reactor.

Air entering unit 39 may alternatively be compressed in a separate compressor.

Figure 3:
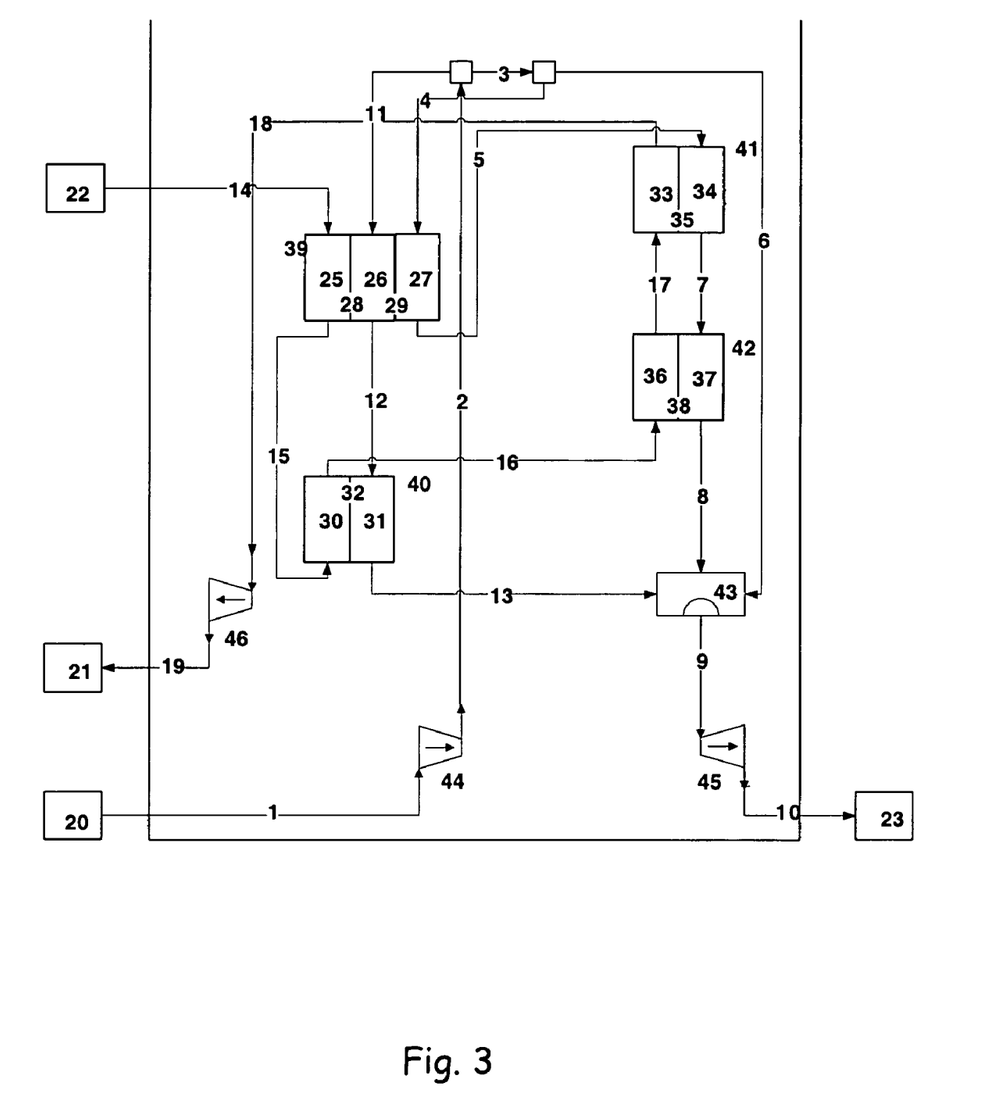
FIG. 3 shows an alternative process to that in FIG. 2 where air fed to the mixed conducting membrane reactor is preheated in the Hydrogen Transport Membrane Syngas and Sweep gas Generator. This will also generate more sweep gas, thus increasing the hydrogen driving force in the Hydrogen Transport Membrane or Hydrogen Transport Membrane Reactor by allowing reduced partial pressure of hydrogen in the sweep gas stream.

FIG. 3 shows a power and heat generation process similar to the process described in FIG. 2, but air stream 4 is preheated in the hydrogen transport membrane syngas and sweep gas generator 39 by transfer of heat from the permeate side 26 to a heat receiving side 27 through a heat transfer surface 29.

The preheated air stream 5 then enters gas/gas heat exchanger 41.

EXAMPLE 1

This example shows a process according to FIG. 1 where the method according to the present invention is utilized in a power plant where the fuel is the hydrogen/nitrogen mixture.

A preheated and desulphurized mixture of natural gas and steam at 550° C., 34 bar and with a steam to carbon ratio of 2.0, stream 14, generated in unit 22, enters the retentate side 25 of a hydrogen transport membrane syngas and sweep gas generator 39 where natural gas and steam are converted by means of steam reforming to synthesis gas containing hydrogen, $CO_2$ and CO. The temperature is increased from 550° C. to about 940–950° C. by means of heat transferred from the permeate side 26. Hydrogen is transported through membrane 28 to the permeate side 26 and reacts with oxygen in air stream 11.

Air, stream 1, from air filter 20, enters a gas turbine compressor 44. The compressed, hot air at 17 bar and 450° C., stream 2, is divided into two streams, 3 and 11. Stream 3 is further heated in unit 49 and fed to the gas turbine combuster 43. Stream 11 enters the permeate side 26 of unit 39, and the oxygen in the air stream reacts with hydrogen transported through membrane 28 from the retentate side 25, to generate a hot, nitrogen containing gas stream at e.g. 950° C., containing less than 1 vol % oxygen, and surplus heat which is transferred to the retentate side 25 where the endothermic reaction occurs. The generated nitrogen and steam containing gas is utilized as sweep gas.

Since gas inlet temperatures to unit 39 are 450 to 550° C. and the exit temperatures are about 950° C. it may be necessary to divide reactor 39 into two or three sections with different type of membrane material to be operated at different temperatures. At moderate temperatures e.g. a Pd/Ag membrane my be used. At higher temperatures a ceramic proton conducting membrane may be used.

Synthesis gas 15 containing 47.4% hydrogen, 19.7% CO, 6.8% $CO_2$, 2.1% methane, 24.0% water at 30 bar enters the retentate side 30 of a downstream hydrogen transport membrane unit 40 and hydrogen is transported through the membrane and is picked up by sweep gas stream 12 at 16.2 bar counterclockwise to stream 15. The hydrogen containing sweep gas, stream 13, containing up to 31% hydrogen, 44% nitrogen and 24% steam, enters gas turbine combuster 43 and hydrogen is combusted in the air stream 8. The hot combusted gas stream 9 is depressurised in gas turbine generator 45 in order to generate mechanical or electrical power (not shown). Hot depressurised exhaust gas 10 enters a heat recovery system 27 in order to recover heat.

Hydrogen depleted synthesis gas stream 16 enters a combuster chamber 47 in heater 49 and is combusted in an oxidant stream 50 that is generated in unit 24. Unit 24 may be a cryogenic air separation unit or an oxygen separation membrane unit or any air separation process capable of separating oxygen from air. The oxidant stream 50 may be a mixture of oxygen and steam, oxygen or $CO_2$ or a mixture of oxygen, $CO_2$ and steam. The air separation process 24 may also be physically and thermally integrated with the power generating process. Heat generated in 47 is partly used to preheat air stream 3 and heat is also recovered as electrical or mechanical power by depressurising the hot gas stream 18 in expander 46. Heat may also be recovered in 21 by generation of steam.

This example shows that it is possible to make a hydrogen/nitrogen mixture, containing a high fraction of hydrogen, by generating a nitrogen and steam containing sweep gas in the same reactor as the hydrogen containing synthesis gas. The low heating value (LHV) of the nitrogen/hydrogen mixture (stream 13) is about 65% of the LHV of stream 13 and stream 16 (the hydrogen depleted gas stream) together, which means that about 65% of the power generated in the process shown in FIG. 1 comes from combustion of hydrogen in the sweep gas mixture and about 35% comes from combustion of the hydrogen depleted synthesis gas with oxygen. Compared to other hydrogen generation processes the hydrogen fuel may be generated and used in a gas turbine combuster without extensive reduction of the power plant efficiency. In other known membrane based hydrogen processes hydrogen must be diluted by e.g. a large amount of steam to be delivered directly to the gas turbine combustor. Addition of a large portion of steam to the gas turbine combuster will, however, reduce the power plant efficiency significantly. Since all heat is generated at high pressure (which allows a major part of the heat to be converted to electrical or mechanical power in an efficient gas turbine) and a major part of steam generated in the power generation process is depressurised in a steam turbine, this will allow production of power at higher efficiency.

If the hydrogen depleted gas stream 16 is combusted with oxygen as shown in FIG. 1 or is combusted in a mixed conducting membrane reactor as shown in FIG. 2 or 3, in order to generate a mixture of $CO_2$ and $H_2O$, $CO_2$ may be recovered from the $CO_2$ and $H_2O$ mixture by condensation of the water. If the hydrogen depleted gas stream 16 is combusted in a mixed conducting membrane reactor, the energy requirement to produce pure oxygen at high pressure will be reduced significantly compared to other oxygen generation methods. This will improve the total power plant efficiency further.

EXAMPLE 2

The table below shows the composition of the hydrogen depleted gas stream 16 which is far from equilibrium since most of the hydrogen is removed. The table shows the composition and temperature after the gas stream has been passed over a steam reforming and CO shift catalyst to establish equilibrium and the equilibrium composition and temperature if more steam is added to stream 16. The total steam addition in this case including the steam added to the feed gas in unit 22, corresponds to a steam to carbon ratio of 3.2. Thus, more CO will be converted to $H_2$ and $CO_2$ as shown in the table.

| Type | Stream 16 | Stream 16 at equilibrium | Stream 16 with steam addition and at equilibrium |
|---|---|---|---|
| $CH_4$, mol % | $CH_4$, mol % | 0.83 | 1.51 |
| $H_2$, mol % | 1.77 | 22.6 | 19.06 |
| CO, mol % | 36.74 | 25.23 | 7.21 |
| $CO_2$, mol % | 12.72 | 24.26 | 23.09 |
| $H_2O$, mol % | 44.61 | 26.88 | 48.99 |
| Others, mol % | 22 | 0.2 | 0.14 |
| Temperature, ° C. | 950 | 890 | 760 |

This shows that the production of hydrogen may be further increased by including a steam reformer and CO shift catalyst on the retentate side of the hydrogen transport membrane unit 40. In Example 1 the partial pressure of hydrogen in stream 15 is 14.2 bar, while the partial pressure of hydrogen in the sweep gas/hydrogen mixture in stream 13 is 5.2 bar. In order to maintain sufficient difference in the partial pressure of hydrogen over the membrane in the case that more hydrogen is generated on the retentate side 30, it may be an advantage to increase the production of sweep gas. This can be done e.g. by preheating air (stream 3 or a part of stream 3 in FIGS. 1 and 2) in the hydrogen transport membrane syngas and sweep gas generator 39. This is illustrated in FIG. 3, where a part of stream 3 (steam 4) is heated in unit 39. Since heat is removed from this unit more oxygen and hydrogen is needed to generate more heat. By this method the amount of sweep gas will be increased which will allow more hydrogen to be recovered in unit 40 or allow a reduction of the required membrane area in unit 40. Thus, the amount of sweep gas can be regulated by varying the amount of air that is heated by heat generated at the retentate side 26 of unit 39.

The invention claimed is:

1. A method for manufacturing a hydrogen- and nitrogen containing gas mixture, wherein said method comprises:

feeding a mixture of steam and a carbon containing gas to a retentate side of at least one hydrogen transport membrane syngas and sweep gas generator where said gas and steam are converted to a synthesis gas which comprises hydrogen, transporting a part of the hydrogen in said synthesis gas through a membrane to a permeate side in said generator where the hydrogen reacts with oxygen in an air stream fed to said permeate side to generate heat and a nitrogen- and steam containing gas, resulting in a hydrogen depleted synthesis gas, partly using the generated heat to heat the air stream and other gases fed to the generator and partly transferring the generated heat back to the retentate side of the generator to meet a heat requirement for steam reforming the carbon containing feed gas, further feeding the synthesis gas to the retentate side of a downstream hydrogen transport membrane unit or a hydrogen transport membrane reactor where a major part of the hydrogen in said synthesis gash and if a reactor is used, a major part of additional hydrogen generated at the retentate side in said reactor, is transported through said downstream membrane and picked up by said nitrogen containing gas to form a hydrogen- and nitrogen containing gas mixture.

2. The method according to claim 1, wherein combustible components in the hydrogen depleted synthesis gas stream leaving the downstream hydrogen transport membrane unit or the hydrogen transport membrane reactor are oxidised to $CO_2$ and water directly on a membrane surface at a permeate side of a mixed conducting membrane reactor.

3. The method according to claim 1, wherein combustible components in the hydrogen depleted synthesis gas stream leaving the downstream hydrogen transport membrane unit or the hydrogen transport membrane reactor react with oxygen that is separated from air by means of a mixed conducting membrane or by means of any other process to generate $CO_2$ and water.

4. The method according to claim 2, further comprising using heat generated by combustion of hydrogen depleted synthesis gas to preheat air fed to a gas turbine combuster.

5. The method according to claim 3, further comprising using heat generated by combustion of hydrogen depleted synthesis gas to preheat air fed to a gas turbine combuster.

* * * * *